(12) United States Patent  
Wu

(10) Patent No.: US 11,532,157 B2
(45) Date of Patent: *Dec. 20, 2022

(54) SYSTEM, METHOD AND APPARATUS FOR OBJECT IDENTIFICATION

(71) Applicant: BEIJING TUSEN ZHITU TECHNOLOGY CO., LTD., Beijing (CN)

(72) Inventor: Nan Wu, Beijing (CN)

(73) Assignee: BEIJING TUSEN ZHITU TECHNOLOGY CO., LTD., Beijing (CN)

(*) Notice: Subject to any disclaimer, the term of this patent is extended or adjusted under 35 U.S.C. 154(b) by 5 days.

This patent is subject to a terminal disclaimer.

(21) Appl. No.: 17/098,168

(22) Filed: Nov. 13, 2020

(65) Prior Publication Data

US 2021/0064878 A1 Mar. 4, 2021

Related U.S. Application Data

(63) Continuation of application No. 16/272,918, filed on Feb. 11, 2019, now Pat. No. 10,839,216.

(30) Foreign Application Priority Data

Feb. 11, 2018 (CN) .......................... 201810142084.0

(51) Int. Cl.
*G06V 20/20* (2022.01)
*G06K 9/62* (2022.01)
(Continued)

(52) U.S. Cl.
CPC ........... *G06V 20/20* (2022.01); *G05D 1/0212* (2013.01); *G06K 9/6215* (2013.01); *G06V 20/58* (2022.01);
(Continued)

(58) Field of Classification Search
CPC ...... G06V 20/20; G06V 20/58; G05D 1/0212; G05D 1/0231; G05D 2201/0213; G06K 9/6215
See application file for complete search history.

(56) References Cited

U.S. PATENT DOCUMENTS 8,195,394 B1   6/2012 Zhu et al.
9,081,383 B1 * 7/2015 Montemerlo ........ G01C 21/005
(Continued)

FOREIGN PATENT DOCUMENTS

CN    101916112 A    12/2010
CN    101966846 A    2/2011
(Continued)

OTHER PUBLICATIONS

No author. Chinese Application No. 201810142084.0, First Office Action dated Nov. 2, 2021, pp. 1-11.

*Primary Examiner* — Utpal D Shah
(74) *Attorney, Agent, or Firm* — Paul Liu; Julie J. Muyco; Perkins Coie, LLP

(57) ABSTRACT

The present disclosure provides a system, a method and an apparatus for object identification, capable of solving the problem in the related art that a system for centralized control and management of unmanned vehicles may not be able to identify an object effectively. The system for object identification includes a sensing device, a control device and one or more unmanned vehicles. The control device is configured to determine an object not belonging to a predetermined category as an unknown object by performing object identification based on sensed data; mark the unknown object in the sensed data including the unknown object; determine an unmanned vehicle within a predetermined range from the unknown object; transmit the sensed data with the marked unknown object and an instruction to identify the unknown object to the determined unmanned (Continued)

vehicle; receive a feedback message from the unmanned vehicle, and when the feedback message carries information on an object category, save the information on the object category and mark a category of the unknown object as the saved object category.

20 Claims, 5 Drawing Sheets

(51) Int. Cl.
  *G05D 1/02* (2020.01)
  *G06V 20/58* (2022.01)
(52) U.S. Cl.
  CPC ... *G05D 1/0231* (2013.01); *G05D 2201/0213* (2013.01)

(56) References Cited

U.S. PATENT DOCUMENTS

| | | | |
|---|---|---|---|
| 9,335,766 B1 * | 5/2016 | Silver | G01S 17/04 |
| 9,418,546 B1 | 8/2016 | Whiting et al. | |
| 9,494,439 B1 * | 11/2016 | Ross | G05D 1/0287 |
| 10,345,809 B2 * | 7/2019 | Ross | G05D 1/0088 |
| 10,404,261 B1 * | 9/2019 | Josefsberg | G01S 13/89 |
| 11,283,877 B2 * | 3/2022 | Kentley-Klay | G06Q 10/00 |
| 2017/0050642 A1 | 2/2017 | Heckmann et al. | |
| 2019/0050646 A1 * | 2/2019 | Pogorelik | G06V 20/35 |
| 2019/0114921 A1 * | 4/2019 | Cazzoli | G06V 20/58 |
| 2019/0187720 A1 * | 6/2019 | Fowe | G06N 20/00 |
| 2020/0175640 A1 * | 6/2020 | Meier | G06V 10/462 |

FOREIGN PATENT DOCUMENTS

| | | |
|---|---|---|
| CN | 102314596 A | 1/2012 |
| CN | 102765356 A | 11/2012 |
| CN | 102944224 A | 2/2013 |
| CN | 104094177 A | 10/2014 |
| CN | 104136935 A | 11/2014 |
| CN | 106103232 A | 11/2016 |
| CN | 106407947 A | 2/2017 |
| CN | 106647742 A | 5/2017 |
| CN | 106794874 A | 5/2017 |
| CN | 107000752 A | 8/2017 |
| CN | 107110426 A | 8/2017 |
| CN | 107161141 A | 9/2017 |
| CN | 107450529 A | 12/2017 |

* cited by examiner

SYSTEM, METHOD AND APPARATUS FOR OBJECT IDENTIFICATION

CROSS-REFERENCE TO RELATED APPLICATIONS

This application is a continuation of U.S. patent application Ser. No. 16/272,918, titled "SYSTEM, METHOD AND APPARATUS FOR OBJECT IDENTIFICATION," filed on Feb. 11, 2019, which in turn claims priority to Chinese patent Application No. 201810142084.0 of the same title and content that was filed by Applicant Beijing Tusen Weilai Technology Co., Ltd. at the State Intellectual Property Office of China (SIPO) on Feb. 11, 2018. The disclosures of these applications are hereby incorporated by reference in their entirety herein.

TECHNICAL FIELD

The present disclosure relates to intelligent transportation, and more particularly, to a system, a method and an apparatus for object identification.

BACKGROUND

In the related art, in some application scenarios, a control system is typically required for controlling and managing unmanned vehicles running in a particular area or site. With sensing devices provided in the area or site for sensing vehicles and road conditions, the control system can identify objects based on sensed data and control and manage the vehicles based on the identified objects, including route planning and driving policy decision.

However, in some application scenarios, due to limitations in installation locations, angles, heights and the like, the sensing devices may not obtain full information on sensed objects. For example, for a camera in a sensing device to obtain information on an object on a road, due to limitation in its installation angle or installation location, it may only obtain information on one surface or one side of the object, such that the control system may not be able to determine the category of the object.

That is, there is a problem that a control system for centralized control and management of unmanned vehicles may not be able to identify an object effectively.

SUMMARY

In view of the above problem, the present disclosure provides a system, a method and an apparatus for object identification, capable of solving the problem in the related art that a system for centralized control and management of unmanned vehicles may not be able to identify an object effectively.

In an aspect of the embodiments of the present disclosure, a system for object identification is provided. The system includes a sensing device, a control device and one or more unmanned vehicles. The sensing device is configured to sense a vehicle running condition and a road condition to obtain sensed data. The control device is configured to determine an object not belonging to a predetermined category as an unknown object by performing object identification based on the sensed data; mark the unknown object in the sensed data including the unknown object; determine an unmanned vehicle within a predetermined range from the unknown object; transmit the sensed data with the marked unknown object and an instruction to identify the unknown object to the determined unmanned vehicle; receive a feedback message from the unmanned vehicle, and when the feedback message carries information on an object category, save the information on the object category and mark a category of the unknown object as the saved object category. The unmanned vehicle is configured to receive the instruction and the sensed data from the control device; identify an object based on sensed data obtained at the unmanned vehicle; compare the object in the sensed data from the control device with the identified object to determine whether the unknown object marked in the sensed data has been identified, and if so, transmit to the control device the feedback message carrying the information on the object category of the identified unknown object.

In an aspect of the embodiments of the present disclosure, a method for object identification is provided. The method includes: determining, by a control device, an object not belonging to a predetermined category as an unknown object by performing object identification based on sensed data from a sensing device, the sensed data being obtained by the sensing device sensing a vehicle miming condition and a road condition; marking the unknown object in the sensed data including the unknown object; determining an unmanned vehicle within a predetermined range from the unknown object; transmitting the sensed data with the marked unknown object and an instruction to identify the unknown object to the determined unmanned vehicle; and receiving a feedback message from the unmanned vehicle, and when the feedback message carries information on an object category, saving the information on the object category and marking a category of the unknown object as the saved object category. The information on the object category carried in the feedback information is the information on the object category of the unknown object identified by the unmanned vehicle and is included in the feedback information by the unmanned vehicle in response to identifying an object based on sensed data obtained at the unmanned vehicle, comparing the object in the sensed data from the control device with the identified object and determining that the unknown object has been identified.

In an aspect of the embodiments of the present disclosure, an apparatus for object identification is provided. The apparatus includes: a first determining module configured to determine an object not belonging to a predetermined category as an unknown object by performing object identification based on sensed data from a sensing device, the sensed data being obtained by the sensing device sensing a vehicle running condition and a road condition; a marking module configured to mark the unknown object in the sensed data including the unknown object; a second determining module configured to determine an unmanned vehicle within a predetermined range from the unknown object; a transceiving module configured to transmit the sensed data with the marked unknown object and an instruction to identify the unknown object to the determined unmanned vehicle and receive a feedback message from the unmanned vehicle, the feedback information carrying information on an object category which is information on an object category of the unknown object identified by the unmanned vehicle and is included in the feedback information by the unmanned vehicle in response to identifying an object based on sensed data obtained at the unmanned vehicle, comparing the object in the sensed data from the control device with the identified object and determining that the unknown object has been identified; and a saving module configured to save, when the feedback message carries the information on the object category, the information on the object category and mark a category of the unknown object as the saved object category.

In an aspect of the embodiments of the present disclosure, an apparatus for object identification is provided. The apparatus includes a processor and at least one memory storing at least one machine executable instruction. The processor is operative to execute the at least one machine executable instruction to: determine an object not belonging to a predetermined category as an unknown object by performing object identification based on sensed data from a sensing device, the sensed data being obtained by the sensing device sensing a vehicle running condition and a road condition; mark the unknown object in the sensed data including the unknown object; determine an unmanned vehicle within predetermined range from the unknown object; transmit the sensed data with the marked unknown object and an instruction to identify the unknown object to the determined unmanned vehicle; and receive a feedback message from the unmanned vehicle, and when the feedback message carries information on an object category, save the information on the object category and mark a category of the unknown object as the saved object category. The information on the object category carried in the feedback information is the information on the object category of the unknown object identified by the unmanned vehicle and is included in the feedback information by the unmanned vehicle in response to identifying an object based on sensed data obtained at the unmanned vehicle, comparing the object in the sensed data from the control device with the identified object and determining that the unknown object has been identified.

With the solutions according to the embodiments of the present disclosure, a control device in a system for object identification analyzes sensed data obtained by a sensing device for object identification, determines an object not belonging to a predetermined category as an unknown object, marks the unknown object in the sensed data, and transmits the sensed data with the marked unknown object to an unmanned vehicle within a predetermined range from the unknown object. The unmanned vehicle compares an object identified from sensed data obtained at the unmanned vehicle with the unknown object marked in the sensed data from the control device to determine whether the unknown object marked in the sensed data has been identified, and if so, transmit to the control device information on an object category. In this way, when the control device is unable to identify an object, the unknown object can be identified by utilizing the information obtaining capability and the identifying capability of the unmanned vehicle, thereby solving the problem in the related art that a system for centralized control and management of unmanned vehicles may not be able to identify an object effectively.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In order to solve the problem in the related art that a system for centralized control and management of unmanned vehicles may not be able to identify an object effectively, the embodiments of the present disclosure provide a system, a method and an apparatus for object identification. With the solutions according to the embodiments of the present disclosure, a control device in a system for object identification analyzes sensed data obtained by a sensing device for object identification, determines an object not belonging to a predetermined category as an unknown object, marks the unknown object in the sensed data, and transmits the sensed data with the marked unknown object to an unmanned vehicle within a predetermined range from the unknown object. The unmanned vehicle compares an object identified from sensed data obtained at the unmanned vehicle with the unknown object marked in the sensed data from the control device to determine whether the unknown object marked in the sensed data has been identified, and if so, transmit to the control device information on an object category. In this way, when the control device is unable to identify an object, the unmanned vehicle can identify the unknown object by obtaining more comprehensive and clear information on the unknown object, so as to solve the problem in the related art that a control and management system for centralized management of unmanned vehicles may not be able to identify an object effectively when a sensing device cannot obtain comprehensive and usable information on the object.

The core idea of the present disclosure has been described above. The solutions according to the embodiments of the present disclosure will be described in further detail below with reference to the figures, such that they can be better understood by those skilled in the art and that the above objects, features and advantages of the embodiments of the present disclosure will become more apparent.

Figure 1:
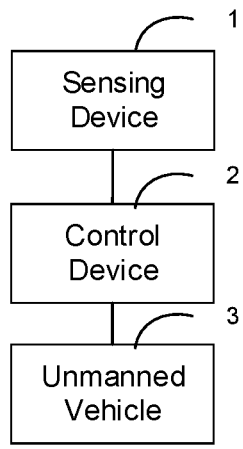
FIG. 1 is a block diagram of a system for object identification according to some embodiments of the present disclosure.

FIG. 1 is a schematic diagram showing a system for object identification according to some embodiments of the present disclosure. The system includes a sensing device 1, a control device 2 and at least one unmanned vehicle 3.

The sensing device 1 may be configured to sense a vehicle running condition and a road condition to obtain sensed data. The sensing device 1 may include at least one camera.

In some application scenarios, the sensing device 1 can sense a vehicle running condition and a road condition within a predetermined area or site, or sense a vehicle or road condition within a particular area or site in an open area.

The control device 2 may be configured to determine an object not belonging to a predetermined category as an unknown object by performing object identification based on the sensed data; mark the unknown object in the sensed data including the unknown object; determine an unmanned vehicle within a predetermined range from the unknown object; transmit the sensed data with the marked unknown object and an instruction to identify the unknown object to the determined unmanned vehicle; receive a feedback message from the unmanned vehicle, and when the feedback message carries information on an object category, save the information on the object category and mark a category of the unknown object as the saved object category.

The unmanned vehicle 3 may be configured to receive the instruction and the sensed data from the control device 2; identify an object based on sensed data obtained at the unmanned vehicle; compare the object in the sensed data from the control device with the identified object to determine whether the unknown object marked in the sensed data has been identified, and if so, transmit to the control device the feedback message carrying the information on the object category of the identified unknown object.

In the system shown in FIG. 1, when the control device determines that an object does not belong to a predetermined category, it determines the object as an unknown object and instructs an unmanned vehicle to identify the object. As the unmanned vehicle typically has a high-resolution camera and other sensing devices, such as a laser radar, it can obtain more comprehensive information of the object and identity the object based on the obtained information. In this way, the control device can identify the unknown object effectively by utilizing the information obtaining capability and the object identifying capability of the unmanned vehicle, thereby solving the problem in the related art that a system for centralized control and management of unmanned vehicles may not be able to identify an object effectively.

In some other embodiments of the present disclosure, the control device 2 may be further configured to, subsequent to marking the unknown object in the sensed data including the unknown object: transmit the sensed data with the marked unknown object to a human identification process, receive a feedback message from the human identification process, and when the feedback message carries information on an object category, save the information on the object category and mark the category of the unknown object as the object category; or when the feedback message carries identification failure information, determine the unmanned vehicle within the predetermined range from the unknown object. That is, when the control device 2 cannot identify the unknown object, the category of the object may be identified by a human identification process. However, due to the incomplete information of the unknown object obtained by the sensing device 1, even the human process may fail to identify the unknown object. In this case, the unmanned vehicle 3 may be instructed to identify the unknown object. In this way, the human identification process may be utilized first to determine the category of the object timely, so as to meet a real-time control requirement of the control device 2. When the human identification process cannot determine the category of the object, the unmanned vehicle 3 may be instructed to identify the unknown object, so as to identify the unknown object effectively by utilizing the information obtaining capability and the object identifying capability of the unmanned vehicle.

In some other embodiments of the present disclosure, the unmanned vehicle 3 may be further configured to mark an object corresponding to the unknown object in the sensed data obtained at the unmanned vehicle, when determining that the unknown object has not been identified, transmit to the control device 2 a feedback message carrying identification failure information and the sensed data obtained at the unmanned vehicle with the marked object. The control device 2 may be further configured to transmit the sensed data obtained at the unmanned vehicle 3 with the marked object to a human identification process when the feedback message from the unmanned vehicle carries the identification failure information; receive a feedback message from the human identification process, and when the feedback message carries information on an object category, save the information on the object category and mark the category of the unknown object as the saved object category, or when the feedback message from the human identification process carries identification failure information, transmit to a human control process the received sensed data obtained at the unmanned vehicle and a human processing request for requesting the human control process to perform an object identification based vehicle control process. In specific application scenarios, in order to meet a requirement on processing speed, the unmanned vehicle 3 may limit the number of categories of objects to be identified. That is, the number of categories of objects that can be identified by the unmanned vehicle 3 may be smaller than the number of categories of objects that can be identified by the control device 2. When the unmanned vehicle 3 cannot identify the category of the unknown object either, the category of the object can be identified by the human identification process timely, so as to meet a real-time control requirement of the control device 2.

Based on the above embodiments, the control device 2 may be further configured to perform a vehicle control process based on the identified object. The vehicle control process may include route planning or driving policy decision.

The operation principle of the control device in FIG. 1 will be explained below.

Figure 2:
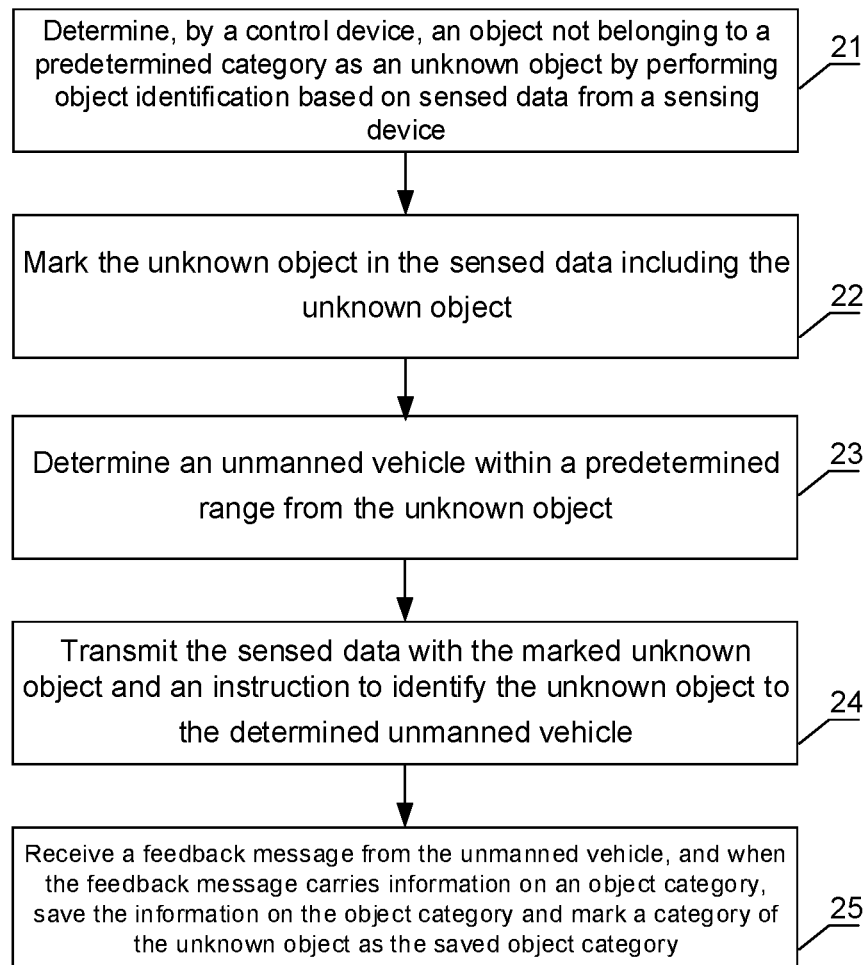
FIG. 2 is a flowchart illustrating a method for object identification according to some embodiments of the present disclosure.

FIG. 2 is a flowchart illustrating a method for object identification according to some embodiments of the present disclosure. The method includes the following steps.

At step 21, a control device determines an object not belonging to a predetermined category as an unknown object by performing object identification based on sensed data from a sensing device. The sensed data is obtained by the sensing device sensing a vehicle running condition and a road condition. The sensed data may be image data obtained by a camera.

At step 22, the unknown object is marked in the sensed data including the unknown object.

That is, the marked sensed data is the sensed data including the marked unknown object. The present disclosure is not limited to any specific method for object identifying or object marking, for which any method known before or developed after the present disclosure may be used and may be selected depending on requirements of specific application scenarios.

At step 23, an unmanned vehicle within a predetermined range from the unknown object is determined.

This step may be performed in conjunction with a positioning technique. With the positioning technique, a position of the unknown object on a map may be determined first based on the sensed data, and, with the positioning technique, positions of unmanned vehicles on the map may be determined and then the unmanned vehicle within the predetermined range from the position of the unknown object may be determined. The present disclosure is not limited to any specific positioning technique. Any positioning technique known before or developed after the present disclosure may be used and any positioning algorithm may be selected depending on requirements of specific application scenarios.

The predetermined range may be set depending on requirements of specific application scenarios. For example, if a subsequent vehicle control or management process based on the object identification requires a large vehicle response range, the predetermined range may be set to a large value; otherwise the predetermined range may be set to a small value.

At step 24, the sensed data with the marked unknown object and an instruction to identify the unknown object are transmitted to the determined unmanned vehicle.

The control device may communicate with the unmanned vehicle by using any of various communication schemes or protocols. The present disclosure is not limited to any specific communication scheme or protocol.

At step 25, a feedback message is received from the unmanned vehicle, and when the feedback message carries information on an object category, the information on the object category is saved and a category of the unknown object is marked as the saved object category. The information on the object category carried in the feedback information is the information on the object category of the unknown object identified by the unmanned vehicle, and is included in the feedback information by the unmanned vehicle in response to identifying an object based on sensed data obtained at the unmanned vehicle, comparing the object in the sensed data from the control device with the identified object and determining that the unknown object has been identified.

With the above process, when the control device determines that an object does not belong to a predetermined category, it determines the object as an unknown object and instructs an unmanned vehicle to identify the object. As the unmanned vehicle typically has a high-resolution camera and other sensing devices, such as a laser radar, it can obtain more comprehensive information of the object and identity the object based on the obtained information efficiently. In this way, the control device can identify the unknown object effectively by utilizing the information obtaining capability and the object identifying capability of the unmanned vehicle, thereby solving the problem in the related art that a system for centralized control and management of unmanned vehicles may not be able to identify an object effectively.

Figure 3:
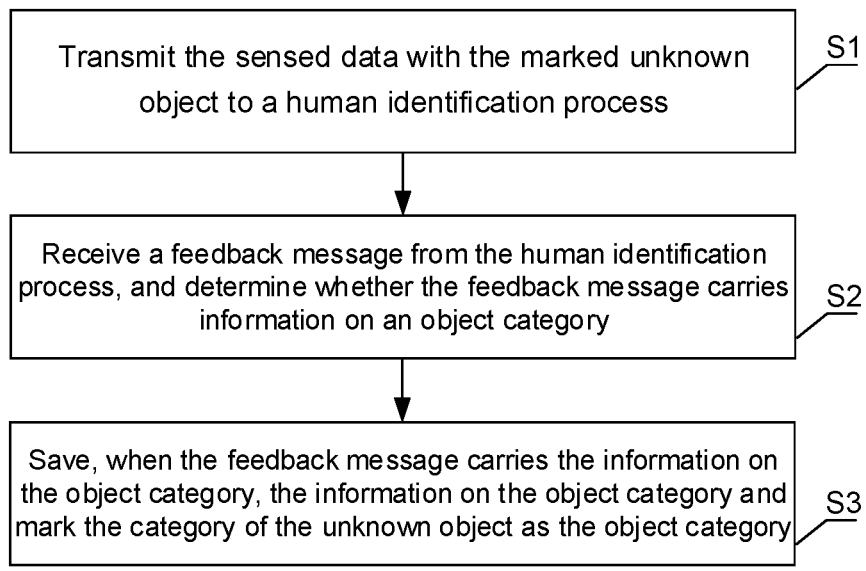
FIG. 3 is another flowchart illustrating a method for object identification according to some embodiments of the present disclosure.

Based on the method shown in FIG. 2, a method for object identification is provided according to some embodiments of the present disclosure. The method may further include the following process after the step 22 and before the step 23 shown in FIG. 2, e.g., after the step 22, as shown in FIG. 3.

At step S1, the sensed data with the marked unknown object is transmitted to a human identification process.

At step S2, a feedback message is received from the human identification process, and it is determined whether the feedback message carries information on an object category. If so, the process proceeds with step S3; otherwise the process proceeds with the step 23.

At step S3, when the feedback message carries the information on the object category, the information on the object category is saved and the category of the unknown object is marked as the object category, the process proceeds with the step 23.

With the above process, when the control device cannot identify the category of the unknown object, it requests a human identification process to identify the category of the unknown object first, such that the category of the object may be identified by the human identification process. However, due to the incomplete information of the unknown object obtained by the sensing device, even the human process may fail to identify the unknown object. In this case, the unmanned vehicle may be instructed to identify the unknown object. In this way, the human identification process may be utilized first to determine the category of the object timely, so as to meet a real-time control requirement of the control device. When the human identification process cannot determine the category of the object, the unmanned vehicle may be instructed to identify the unknown object, so as to identify the unknown object effectively by utilizing the information obtaining capability and the object identifying capability of the unmanned vehicle.

Figure 4:
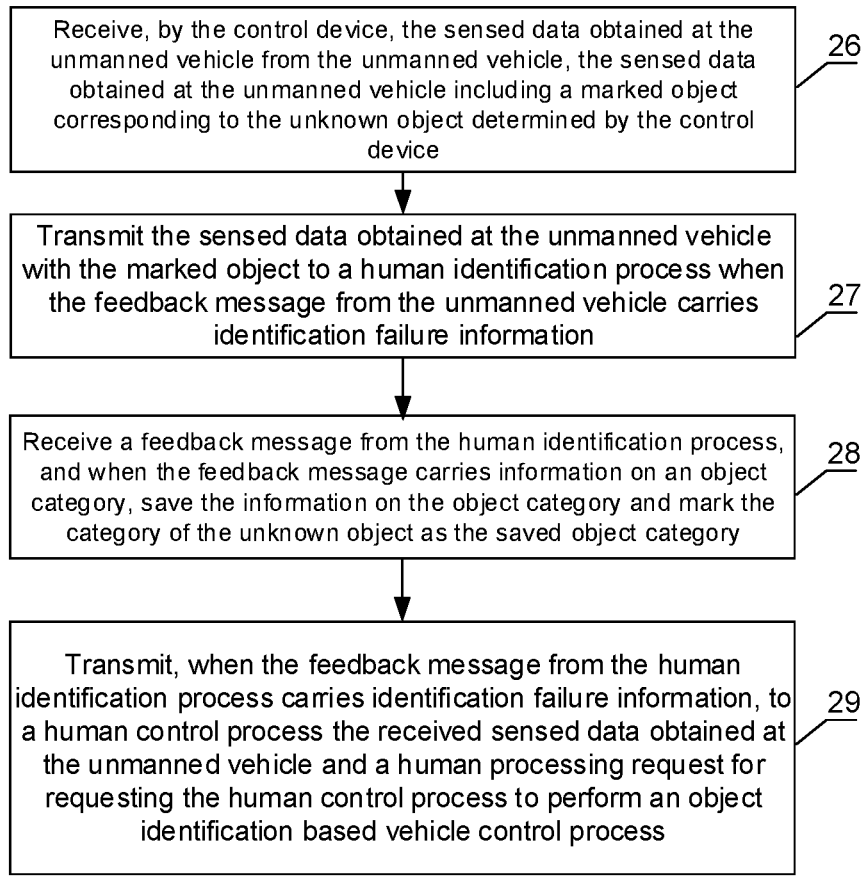
FIG. 4 is another flowchart illustrating a method for object identification according to some embodiments of the present disclosure.

Based on the method shown in FIG. 2 or 3, a method for object identification is provided according to some embodiments of the present disclosure. As shown in FIG. 4, the method may further include the following process in addition to the method shown in FIG. 2 or 3.

At step 26, the control device receives the sensed data obtained at the unmanned vehicle from the unmanned vehicle. The sensed data obtained at the unmanned vehicle includes a marked object corresponding to the unknown object determined by the control device.

That is, when the unmanned vehicle cannot identify the object, it marks the object corresponding to the unknown object in the sensed data obtained at the unmanned vehicle and transmits the sensed data obtained at the unmanned vehicle with the marked object to the control device.

At step 27, when the feedback message from the unmanned vehicle carries identification failure information, the sensed data obtained at the unmanned vehicle with the marked object is transmitted to a human identification process.

At step 28, a feedback message is received from the human identification process, and when the feedback message carries information on an object category, the information on the object category is saved and the category of the unknown object is marked as the saved object category.

At step 29, when the feedback message from the human identification process carries identification failure information, the received sensed data obtained at the unmanned vehicle and a human processing request for requesting a human control process to perform an object identification based vehicle control process are transmitted to the human control process.

In the process shown in FIG. 4, as an unmanned vehicle typically performs object identification based on categories, i.e., predetermined categories, it has learned from training, an object not belonging to any of the predetermined categories may not be identified. In typical application scenarios, in order to meet a requirement on processing speed, the unmanned vehicle may limit the number of categories of objects that can be identified. That is, the number of categories of objects that can be identified by the unmanned vehicle may be smaller than the number of categories of objects that can be identified by the control device. When the unmanned vehicle cannot identify the category of the unknown object, the human identification process can be requested to identify the category of the unknown object, so as to further ensure that the unknown object can be identified. In this way, the category of the object can be determined timely, so as to meet a real-time control requirement of the control device and provide correct data input to the subsequent object identification based vehicle control management process. When the human identification process cannot identify the unknown object either, the human control process may be requested to perform the subsequent object identification based vehicle control management process, so as to ensure that the object identification based vehicle control management process may be performed properly.

Further, based on the methods shown in FIGS. 2-4, the control device may be further configured to perform a vehicle control process based on the identified object. The vehicle control process may include route planning or driving policy decision.

In some other embodiments of the present disclosure, the above embodiments may be combined with each other.

Based on the same inventive concept, an apparatus for object identification is also provided. The apparatus includes the following modules.

Figure 5:
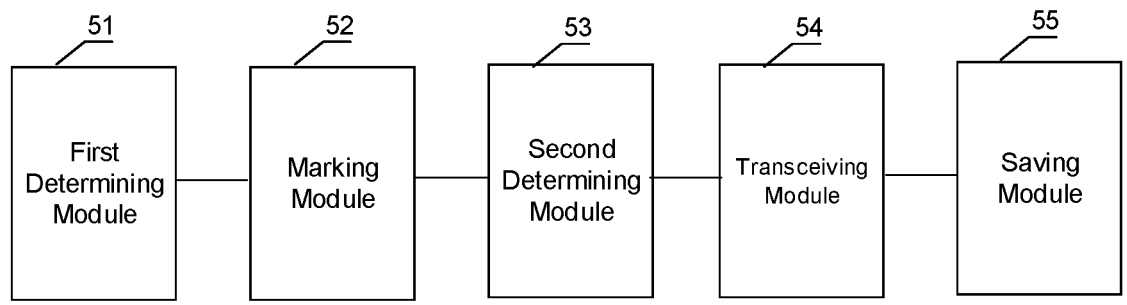
FIG. 5 is a block diagram of an apparatus for object identification according to some embodiments of the present disclosure.

FIG. 5 is a block diagram of an apparatus for object identification according to some embodiments of the present disclosure. The apparatus includes the following modules.

A first determining module 51 may be configured to determine an object not belonging to a predetermined category as an unknown object by performing object identification based on sensed data from a sensing device. The sensed data is obtained by the sensing device sensing a vehicle running condition and a road condition.

A marking module 52 may be configured to mark the unknown object in the sensed data including the unknown object.

A second determining module 53 may be configured to determine an unmanned vehicle within a predetermined range from the unknown object.

A transceiving module 54 may be configured to transmit the sensed data with the marked unknown object and an instruction to identify the unknown object to the determined unmanned vehicle and receive a feedback message from the unmanned vehicle. The feedback information carries information on an object category which is information on an object category of the unknown object identified by the unmanned vehicle and is included in the feedback information by the unmanned vehicle in response to identifying an object based on sensed data obtained at the unmanned vehicle, comparing the object in the sensed data from the control device with the identified object and determining that the unknown object has been identified.

A saving module 55 may be configured to save, when the feedback message carries the information on the object category, the information on the object category and mark a category of the unknown object as the saved object category.

With the above solution, when the control device determines that an object does not belong to a predetermined category, it determines the object as an unknown object and instructs an unmanned vehicle to identify the object. As the unmanned vehicle typically has a high-resolution camera and other sensing devices, such as a laser radar, it can obtain more comprehensive information of the object and identity the object based on the obtained information. In this way, the control device can identify the unknown object effectively by utilizing the information obtaining capability and the object identifying capability of the unmanned vehicle, thereby solving the problem in the related art that a system for centralized control and management of unmanned vehicles may not be able to identify an object effectively.

Figure 6A:
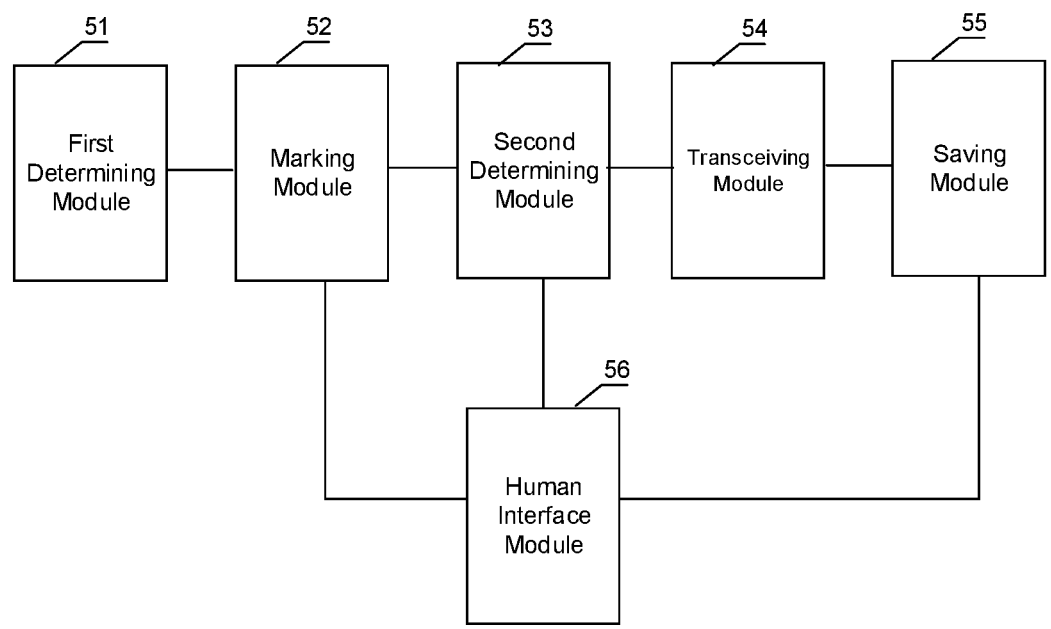
FIG. 6a is another block diagram of an apparatus for object identification according to some embodiments of the present disclosure.

In some other embodiments of the present disclosure, as shown in FIG. 6a, the apparatus may further include a human interface module 56 configured to transmit the sensed data with the unknown object marked by the marking module 52 to a human identification process and receive a feedback message from the human identification process.

The saving module 55 may be further configured to save, when the feedback message carries information on an object category, the information on the object category and mark the category of the unknown object as the object category.

The second determining module 53 may be further configured to determine the unmanned vehicle within the predetermined range from the unknown object when the feedback message carries identification failure information.

With the above solution, when the control device cannot identify the category of the unknown object, it requests a human identification process to identify the category of the unknown object first, such that the category of the object may be identified by the human identification process. However, due to the incomplete information of the unknown object obtained by the sensing device, even the human process may fail to identify the unknown object. In this case, the unmanned vehicle may be instructed to identify the unknown object. In this way, the human identification process may be utilized first to determine the category of the object timely, so as to meet a real-time control requirement of the control device. When the human identification process cannot determine the category of the object, the unmanned vehicle may be instructed to identify the unknown object, so as to identify the unknown object effectively by utilizing the information obtaining capability and the object identifying capability of the unmanned vehicle.

Figure 6B:
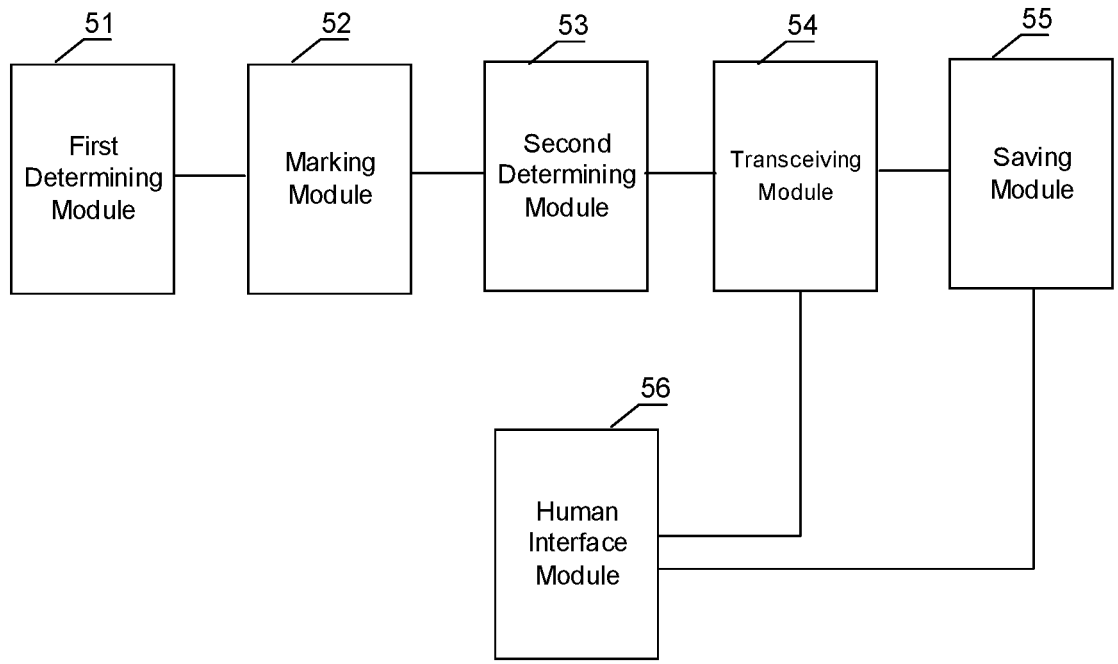
FIG. 6b is another block diagram of an apparatus for object identification according to some embodiments of the present disclosure.
Figure 7:
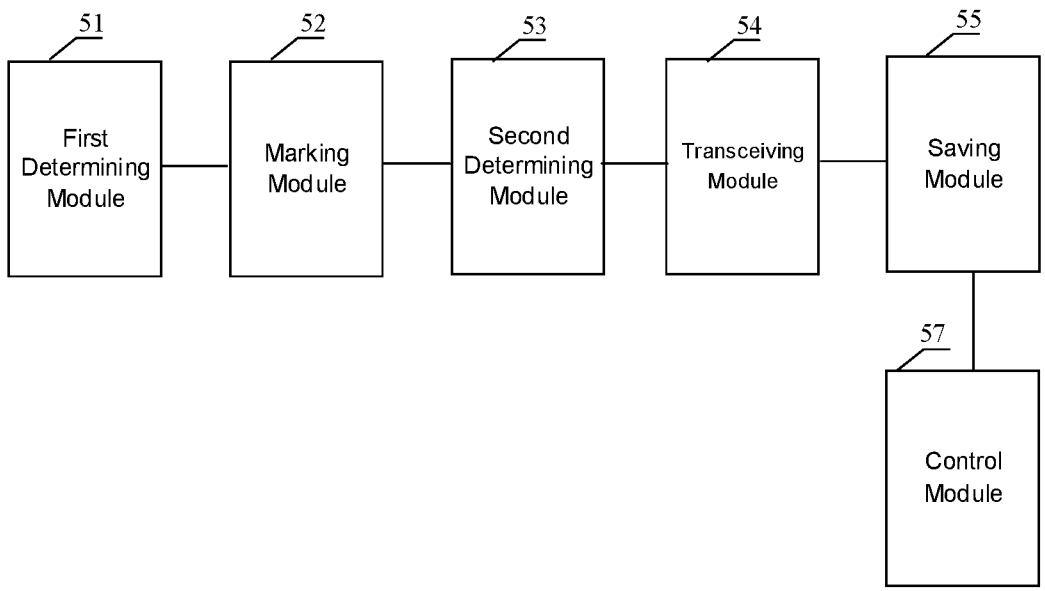
FIG. 7 is another block diagram of an apparatus for object identification according to some embodiments of the present disclosure.
Figure 8:
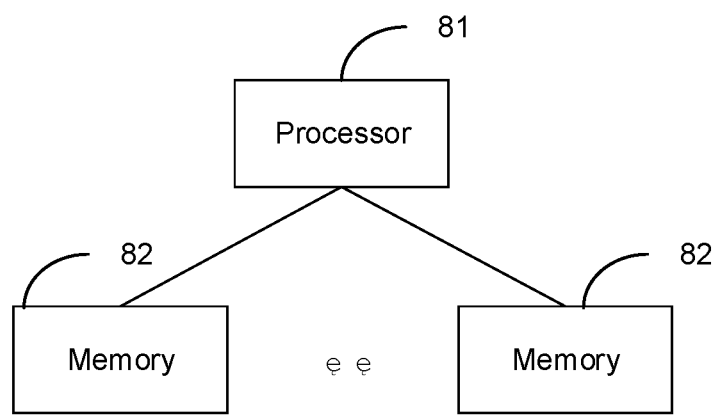
FIG. 8 is another block diagram of an apparatus for object identification according to some embodiments of the present disclosure.

In some other embodiments of the present disclosure, as shown in FIG. 6b, the transceiving module 54 may be further configured to receive the sensed data obtained at the unmanned vehicle from the unmanned vehicle. The sensed data obtained at the unmanned vehicle includes a marked object corresponding to the unknown object determined by the control device.

The human interface module 56 may be configured to transmit the sensed data obtained at the unmanned vehicle with the marked object to a human identification process when the feedback message from the unmanned vehicle carries identification failure information and receive a feedback message from the human identification process.

The saving module 55 may be further configured to save, when the feedback message from the human identification process carries information on an object category, the information on the object category and mark the category of the unknown object as the saved object category.

The human interface module 56 may be further configured to transmit, when the feedback message from the human identification process carries identification failure information, to a human control process the received sensed data obtained at the unmanned vehicle and a human processing request for requesting the human control process to perform an object identification based vehicle control process.

With the above solution, as an unmanned vehicle typically performs object identification based on categories, i.e., predetermined categories, it has learned from training, an object not belonging to any of the predetermined categories may not be identified. In typical application scenarios, in order to meet a requirement on processing speed, the unmanned vehicle may limit the number of categories of objects that can be identified. That is, the number of categories of objects that can be identified by the unmanned vehicle may be smaller than the number of categories of objects that can be identified by the control device. When the unmanned vehicle cannot identify the category of the unknown object, the human identification process can be requested to identify the category of the unknown object, so as to further ensure that the unknown object can be identified. In this way, the category of the object may be determined timely, so as to meet a real-time control requirement of the control.

What is claimed is:

1. A system for object identification, comprising a sensing device, a control device and one or more unmanned vehicles, wherein
    the sensing device is configured to sense a vehicle running condition and a road condition to obtain sensed data;
    the control device is configured to:
        determine an object not belonging to a predetermined category as an unknown object by performing object identification based on the sensed data;
        mark the unknown object in the sensed data that include the unknown object;
        determine an unmanned vehicle within a predetermined range from the unknown object;
        transmit the sensed data with the marked unknown object and an instruction to identify the unknown object to the determined unmanned vehicle; and
        receive a feedback message from the unmanned vehicle; and
    the unmanned vehicle is configured to:
        receive the instruction and the sensed data from the control device;
        identify an object based on sensed data obtained at the unmanned vehicle;
        compare the object in the sensed data from the control device with the identified object to determine whether the unknown object marked in the sensed data has been identified, and if so, transmit to the control device the feedback message carrying the information on the object category of the identified unknown object.

2. The system of claim 1, wherein the unmanned vehicle is further configured to:
    mark an object corresponding to the unknown object in the sensed data obtained at the unmanned vehicle, and
    when determining that the unknown object has not been identified, transmit to the control device a feedback message carrying identification failure information and the sensed data obtained at the unmanned vehicle with the marked object.

3. The system of claim 1, wherein the control device is further configured to:
    transmit the sensed data obtained at the unmanned vehicle with an object marked by the unmanned object that corresponds to the object to a human identification process when the feedback message from the unmanned vehicle carries the identification failure information;
    receive a feedback message from the human identification process; and
    when the feedback message carries information on an object category, save the information on the object category and mark the category of the unknown object as the saved object category.

4. The system of claim 3, wherein the control device is further configured to:
    when the feedback message from the human identification process carries identification failure information, transmit to a human control process the received sensed data obtained at the unmanned vehicle and a human processing request for requesting the human control process to perform an object identification based vehicle control process.

5. The system of claim 1, wherein the control device is further configured to, subsequent to marking the unknown object in the sensed data including the unknown object: transmit the sensed data with the marked unknown object to a human identification process.

6. The system of claim 5, wherein said determining the unmanned vehicle within the predetermined range from the unknown object comprises:
    receiving a feedback message from the human identification process, and
    when the feedback message carries information on an object category, saving the information on the object category and marking the category of the unknown object as the object category; and
    when the feedback message carries identification failure information, determining the unmanned vehicle within the predetermined range from the unknown object.

7. The system of claim 1, wherein the control device is further configured to perform a vehicle control process based on the identified object, the vehicle control process comprising route planning or driving policy decision.

8. A method for object identification, comprising:
    determining, by a control device, an object not belonging to a predetermined category as an unknown object by performing object identification based on sensed data from a sensing device, the sensed data being obtained by the sensing device sensing a vehicle running condition and a road condition;
    marking, by the control device, the unknown object in the sensed data including the unknown object;
    determining, by the control device, an unmanned vehicle within a predetermined range from the unknown object;
    transmitting, by the control device, the sensed data with the marked unknown object and an instruction to identify the unknown object to the determined unmanned vehicle; and
    receiving, by the control device, a feedback message from the unmanned vehicle, and when the feedback message carries information on an object category, saving the information on the object category and marking a category of the unknown object as the saved object category.

9. The method of claim 8, wherein the information on the object category carried in the feedback information is the information on the object category of the unknown object identified by the unmanned vehicle and is included in the feedback information by the unmanned vehicle in response to identifying an object based on sensed data obtained at the unmanned vehicle, comparing the object in the sensed data from the control device with the identified object and determining that the unknown object has been identified.

10. The method of claim 8, further comprising:
receiving, by the control device, the sensed data obtained at the unmanned vehicle from the unmanned vehicle, the sensed data obtained at the unmanned vehicle including a marked object corresponding to the unknown object determined by the control device;
transmitting, by the control device, the sensed data obtained at the unmanned vehicle with the marked object to a human identification process when the feedback message from the unmanned vehicle carries identification failure information; and
receiving, by the control device, a feedback message from the human identification process, and when the feedback message carries information on an object category, saving the information on the object category and marking the category of the unknown object as the saved object category.

11. The method of claim 10, further comprising:
transmitting, when the feedback message from the human identification process carries identification failure information, to a human control process the received sensed data obtained at the unmanned vehicle and a human processing request for requesting the human control process to perform an object identification based vehicle control process.

12. The method of claim 8, wherein the control device is further configured to, subsequent to marking the unknown object in the sensed data including the unknown object: transmit the sensed data with the marked unknown object to a human identification process, and
wherein said determining the unmanned vehicle within the predetermined range from the unknown object comprises:
receiving a feedback message from the human identification process, and when the feedback message carries information on an object category, saving the information on the object category and marking the category of the unknown object as the object category; or when the feedback message carries identification failure information, determining the unmanned vehicle within the predetermined range from the unknown object.

13. The method of claim 8, further comprising:
performing, by the control device, a vehicle control process based on the identified object, the vehicle control process comprising route planning or driving policy decision.

14. An apparatus for object identification, comprising:
a first determining module configured to determine an object not belonging to a predetermined category as an unknown object by performing object identification based on sensed data from a sensing device, the sensed data being obtained by the sensing device sensing a vehicle running condition and a road condition;
a marking module configured to mark the unknown object in the sensed data including the unknown object;
a second determining module configured to determine an unmanned vehicle within a predetermined range from the unknown object;
a transceiving module configured to transmit the sensed data with the marked unknown object and an instruction to identify the unknown object to the determine unmanned vehicle and receive a feedback message from the unmanned vehicle, the feedback information carrying information on an object category which is information on an object category of the unknown object identified by the unmanned vehicle and is included in the feedback information by the unmanned vehicle in response to identifying an object based on sensed data obtained at the unmanned vehicle, comparing the object in the sensed data from the control device with the identified object and determining that the unknown object has been identified; and
a saving module configured to save, when the feedback message carries the information on the object category, the information on the object category and mark a category of the unknown object as the saved object category.

15. The apparatus of claim 14, further comprising a human interface module, the human interface module configured to transmit the sensed data obtained at the unmanned vehicle with the marked object to a human identification process when the feedback message from the unmanned vehicle carries identification failure information and receive a feedback message from the human identification process; and
the saving module is further configured to save, when the feedback message from the human identification process carries information on an object category, the information on the object category and mark the category of the unknown object as the saved object category.

16. The apparatus of claim 15, wherein the human interface module is further configured to:
transmit, when the feedback message from the human identification process carries identification failure information, to a human control process the received sensed data obtained at the unmanned vehicle and a human processing request for requesting the human control process to perform an object identification based vehicle control process.

17. The apparatus of claim 14, further comprising a human interface module configured to transmit the sensed data with the unknown object marked by the marking module to a human identification process and receive a feedback message from the human identification process, wherein:
the saving module is configured to save, when the feedback message carries information on an object category, the information on the object category and mark the category of the unknown object as the object category, and
the second determining module is configured to determine the unmanned vehicle within the predetermined range from the unknown object when the feedback message carries identification failure information.

18. The apparatus of claim 14, further comprising a control module configured to perform a vehicle control process based on the identified object, the vehicle control process comprising route planning.

19. The apparatus of claim 14, further comprising a control module configured to perform a vehicle control process based on the identified object, the vehicle control process comprising driving policy decision.

20. The apparatus of claim 14, wherein the transceiving module is further configured to receive the sensed data obtained at the unmanned vehicle from the unmanned vehicle, the sensed data obtained at the unmanned vehicle including a marked object corresponding to the unknown object determined by the control device.

* * * * *